(12) United States Patent
Kumhyr

(10) Patent No.: US 7,036,113 B1
(45) Date of Patent: Apr. 25, 2006

(54) DETECTION OF RESOURCE EXCEPTIONS

(75) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 09/697,448

(22) Filed: Oct. 26, 2000

(51) Int. Cl.
G06F 9/45 (2006.01)

(52) U.S. Cl. ............... 717/142; 717/128; 717/131

(58) Field of Classification Search ........... 717/124, 717/126, 127–128, 162–165, 131–133, 140–157; 714/48; 709/104; 700/99; 712/233–244
See application file for complete search history.

(56) References Cited

U.S. PATENT DOCUMENTS

| | | | | |
|---|---|---|---|---|
| 5,073,855 A | * | 12/1991 | Staplin et al. | 712/217 |
| 5,206,951 A | * | 4/1993 | Khoyi et al. | 709/315 |
| 5,537,596 A | * | 7/1996 | Yu et al. | 717/168 |
| 5,935,210 A | * | 8/1999 | Stark | 709/224 |
| 5,953,526 A | | 9/1999 | Day et al. | 395/701 |
| 6,009,517 A | | 12/1999 | Bak et al. | 712/245 |
| 6,081,665 A | * | 6/2000 | Nilsen et al. | 717/116 |
| 6,088,718 A | | 7/2000 | Altschuler et al. | 709/203 |
| 6,151,703 A | * | 11/2000 | Crelier | 717/136 |
| 6,163,780 A | * | 12/2000 | Ross | 707/101 |
| 6,189,137 B1 | * | 2/2001 | Hoffman | 717/115 |
| 6,526,565 B1 | * | 2/2003 | Nally | 717/108 |
| 6,598,181 B1 | * | 7/2003 | Pennell | 714/38 |

OTHER PUBLICATIONS

"Perl Cookbook" by Tom Christiansen et al., 1998, "Section 7. File Access".*
"Kernal Korner: The ELF Object File Format: Introduction" by Eric Youngdale, Apr. 1995. Source: http://www.linuxjournal.com.*
IBM Technical Disclosure Bulletin, "Efficient Implementation of ACLS for Object-Oriented Systems", vol. 36, No. 3, pp. 329-332, Mar. 1993.*
Bogda et al., "Removing Unnecessary Synchronization in Java", Technical Report TRCS99-10, University of California, Dept. of Computer Science, pp.:1-16, Apr. 1999.*

* cited by examiner

Primary Examiner—Ted T. Vo
(74) Attorney, Agent, or Firm—Duke W. Yee; Jeffrey S. LaBaw; Wayne P. Bailey

(57) ABSTRACT

A method, computer program product and data processing system for detecting resource exception errors. Resource exception errors may be detected by scanning code for a method invocation used to open a resource file. Upon identifying a method invocation, the code may be scanned for a method signature, i.e., pointer, associated with the identified method invocation. The method signature points to the resource file to be opened by the method invocation. The code may be further scanned for a pair of string delimiters adjacent to the method signature. The string within the pair of string delimiters is a key to the resource file. The resource file may then be opened using the method invocation previously identified. A resource exception error is detected if the key or its associated value are not defined in the resource file.

50 Claims, 3 Drawing Sheets

DETECTION OF RESOURCE EXCEPTIONS

CROSS REFERENCE TO RELATED APPLICATIONS

The present invention is related to the following U.S. Patent Applications which are incorporated herein by reference:

Ser. No. 09/697,446 entitled "Identifying Non-Externalized Text Strings That Are Not Hard-Coded" filed Oct. 26, 2000.

Ser. No. 09/697,445 entitled "Pre-Processing Code to Identify and Modify Format of Keys" filed Oct. 26, 2000, now U.S. Pat. No. 6,839,712 B1.

TECHNICAL FIELD

The present invention relates to the field of internationalization, and more particularly to a scanning program that detects resource exception errors prior to the run-time of the application.

BACKGROUND INFORMATION

Internationalization is a process of enabling a program, e.g., Java, to run internationally. That is, an internationalized program has the flexibility to run correctly in any country. An internationalized program must be able to read, write and manipulate localized text. Furthermore, an internationalized program must conform to local customs when displaying dates and times, formatting numbers and sorting strings.

Internationalization is becoming increasingly important with the explosive growth of the Internet and the World Wide Web where an ever increasing number of computer users are from various locales. A locale represents a geographic, cultural or political region. One of the problems with internationalization involves the use of text strings that may be hard-coded in the program, e.g., Java. Hard-coded text strings refer to text that will not vary with the locale. That is, the text strings may appear in English even when the program is run on the French locale. Various object-oriented languages such as Java have developed tools to assist in developing internationalized programs and allowing text strings to appear in the language of the locale. A discussion of object-oriented programming languages and in particular Java is deemed appropriate.

In an object-oriented programming language such as Java, a class is a collection of data and methods that operate on that data. The data and methods taken together describe the state and behavior of what is commonly referred to as an object. An object in essence includes data and code where the code manipulates the data. Hence a software application may be written using an object-oriented programming language such as Java whereby the program's functionality is implemented using objects.

Unlike many programming languages, Java is compiled into machine independent code commonly referred to as bytecodes instead of machine dependent code, i.e. executable code. Bytecodes are stored in a particular file format commonly referred to as a "class file" that includes bytecodes for methods of a class. In addition to the bytecodes for methods of a class, the class file includes a symbol file as well as other ancillary information.

A computer program embodied as Java bytecodes in one or more class files is platform independent. The computer program may be executed, unmodified, on any computer that is able to run an implementation of what is commonly referred to as a Java virtual machine. The Java virtual machine is not an actual hardware platform, but rather a low level software emulator that can be implemented on many different computer processor architectures and under many different operating systems. The Java virtual machine reads and interprets each bytecode so that the instructions may be executed by the native processor. Hence a Java bytecode is capable of functioning on any platform that has a Java virtual machine implementation available. However, bytecode interpretation detracts from processor performance since the microprocessor has to spend some of its processing time interpreting bytecode instructions. Compilers commonly referred to as "just in time (JIT)" were developed to improve the performance of Java virtual machines. A JIT compiler translates Java bytecodes into the processor's native machine code during runtime. The processor then executes the compiled native machine code.

As stated above Java has developed tools to assist in developing internationalized programs and allowing text strings to appear in the language of the locale. One such tool is the use of resource files commonly referred to in Java as resource bundles. A resource bundle class may be used for externalizing text strings, i.e. messages. By externalizing text strings, appropriate text strings appear in the language of the locale. The resource bundle class is an associative array of keys and values. Keys are free formatted strings that appear in the program code as well as in the resource bundle thereby allowing the program to access the externalized string. Externalized strings may be represented as a value associated with the key. That is, appropriate text strings for a given locale are indexed by keys. Hence, the program may access an externalized string by accessing the value associated with the key in the resource bundle, i.e. the key that matches the key in the program code. By having resource bundles associated with particular locales, e.g., a resource file with resources associated with the US English locale, a resource file with resources associated with the French locale and so forth, appropriate text strings associated with the particular locale may be loaded at runtime.

Unfortunately, software developers may not define a key-value pair in the resource file, e.g., resource bundle, or mistype the key, i.e. free formatted string, in either the program code or the resource file source code thereby resulting in a resource exception error during the run-time of the application, e.g., Java. For example, a key-value pair in the resource file, e.g., resource bundle, may not be defined when there is no key or value associated with the key in the resource file, e.g., resource bundle. Furthermore, software developers may mistype the key, i.e. free formatted string, in either the program code or in the resource file source code so that the key, i.e. free formatted string, in the program code and in the resource file source code do not match and thereby prevent the program from accessing the externalized string in the resource file. When a procedure, commonly referred to as a method, in Java attempts to load an external string from the resource bundle and either the key-value pair is not defined in the resource file or the key in either the program code or resource file source code is mistyped, a resource exception error results. It would therefore be desirable to detect resource exception errors prior to the run-time of the application and subsequently define the key-value pair in the resource file, e.g., resource bundle, or correct the mistyped key in either the program code or resource file source code so as to avoid resource exception errors.

SUMMARY

The problems outlined above may at least in part be solved in some embodiments by a scanning program that detects method invocations that are used to open resource files to detect resource exception errors. After identifying a method invocation, the scanning program scans for a method signature, i.e. pointer, associated with the identified method invocation. The method signature points to the resource file to be opened by the method invocation. The scanning program further scans for a pair of string delimiters adjacent to the method signature. The string within the pair of string delimiters is a key to the resource file to be opened by the method invocation. Once the resource file is opened, the scanning program determines whether the key and the value associated with the key are defined in the resource file. If the key or its associated value is not defined in the resource file, then a resource exception error is detected.

In one embodiment, a method for detecting resource exceptions comprises the step of scanning a code for a method invocation used to open a resource file. The method further comprises the step of identifying the method invocation. The method further comprises the step of scanning the code for a method signature where the method signature points to the resource file to be opened by the method invocation. The method further comprises the step of scanning the code for a pair of string delimiters adjacent to the method signature where a string within the pair of string delimiters is a key of the resource file. The method further comprises the step of opening the resource file using the method invocation identified to detect resource exception errors. If the key or the associated value is not defined in the resource file, then a resource exception error is detected.

In another embodiment of the present invention, the method comprises the step of generating a report where the report may comprise a listing of all resource errors detected upon completing the scanning the code.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and data processing system for detecting resource exception errors. In one embodiment of the present invention, a scanning program scans for a method invocation used to open a resource file. After identifying a method invocation, the scanning program scans for a method signature, i.e. pointer, associated with the identified method invocation. The method signature points to the resource file to be opened by the method invocation. The scanning program further scans for a pair of string delimiters adjacent to the method signature. The string within the pair of string delimiters is a key to the resource file to be opened by the method invocation. Once the resource file is opened, the scanning program determines whether the key and the value associated with the key are defined in the resource file. If the key or its associated value is not defined in the resource file, then a resource exception error is detected. In another embodiment of the present invention, a report may be generated where the report may comprise a listing of all resource errors detected upon completing the scanning the code. It is noted that even though the following discusses the present invention in conjunction with a Java programming environment the present invention may be implemented in any type of programming environment where the programming language has the capability of externalizing text strings in resource files.

Figure 1:
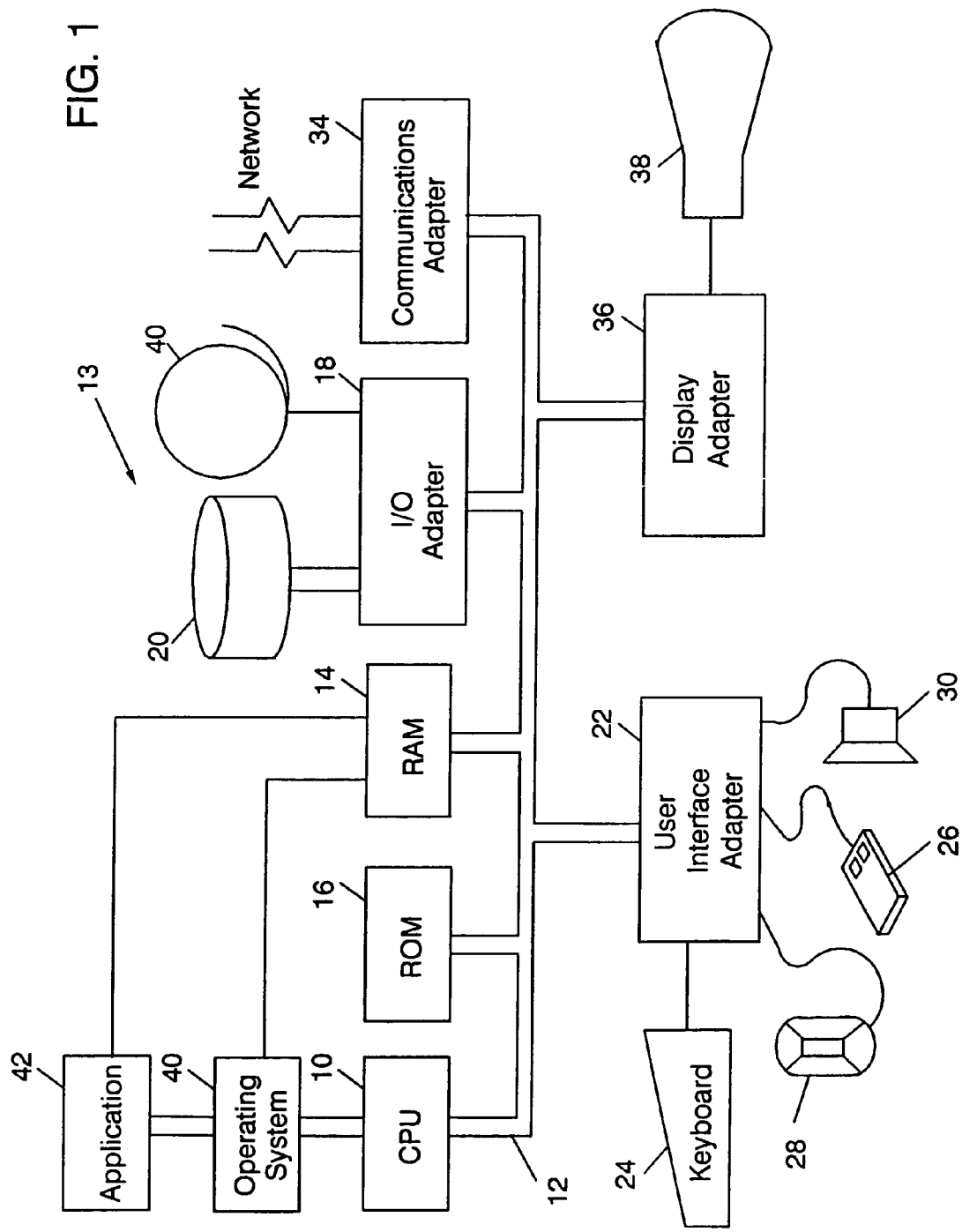
FIG. 1 illustrates a data processing system configured in accordance with the present invention.

FIG. 1—Computer System

FIG. 1 illustrates a typical hardware configuration of data processing system 13 which is representative of a hardware environment for practicing the present invention. Data processing system 13 has a central processing unit (CPU) 10, such as a conventional microprocessor, coupled to various other components by system bus 12. An operating system 40, e.g., DOS, OS/2™, runs on CPU 10 and provides control and coordinates the function of the various components of FIG. 1. An object-oriented programming system, such as Java 42, runs in conjunction with operating system 40 and provides output calls to operating system 40 which implements the various functions to be performed by the application 42. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. It should be noted that software components including operating system 40 and application 42 are loaded into RAM 14 which is the computer system's main memory. I/O adapter 18 may be a small computer system interface ("SCSI") adapter that communicates with disk units 20, e.g., disk drive, and tape drives 40. It is noted that the scanning program of the present invention that detects resource exception errors may reside in disk unit 20 or in application 42. Communications adapter 34 interconnects bus 12 with an outside network enabling data processing system 13 to communication with other such systems. Input/Output devices are also connected to system bus 12 via a user interface adapter 22 and a display adapter 36. Keyboard 24, trackball 28, mouse 26 and speaker 30 are all interconnected to bus 12 through user interface adapter 22. Event data may be input to the object-oriented programming system through any of these devices. A display monitor 38 is connected to system bus 12 by display adapter 36. In this manner, a user is capable of inputting to system 13 through keyboard 24, trackball 28 or mouse 26 and receiving output from system 13 via display 38 or speaker 30.

Preferred implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in disk drive 20).

Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
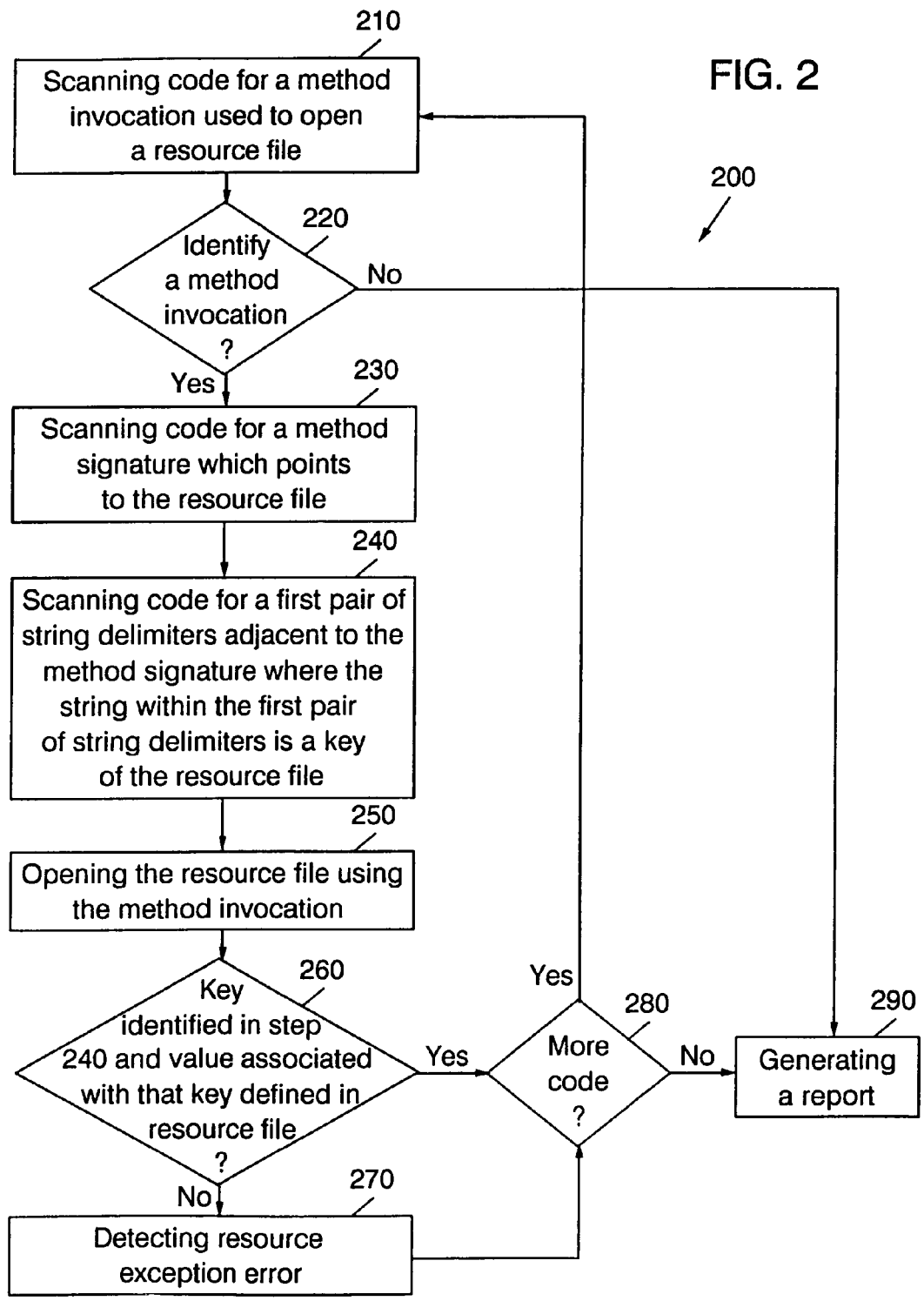
FIG. 2 is a flowchart of a method for detecting resource exception errors.

FIG. 2-M*ethod* For Detecting Resource Exception Errors

FIG. 2 illustrates a flowchart of one embodiment of the present invention of a method 200 for detecting resource exception errors prior to the run-time of the application 42. As stated in the Background Information section, software developers may not define a key-value pair in the resource file, e.g., resource bundle, or mistype the key, i.e. free formatted string, in either the program code or the resource file source code thereby resulting in a resource exception error during the run-time of the application, e.g., Java. That is, when a procedure, commonly referred to as a method, in Java attempts to load an external string from the resource bundle and either the key-value pair is not defined in the resource file or the key in either the program code or resource file source code is mistyped, a resource exception error results. It would therefore be desirable to detect resource exception errors prior to the run-time of the application and subsequently define the key-value pair in the resource file, e.g., resource bundle, or correct the mistyped key in either the program code or resource file source code so as to avoid resource exception errors. Method 200 is a method that detects resource exception errors prior to the run-time of application 42.

In step 210, a scanning program scans the code of an application program 42, e.g., Java, line by line for a method invocation for opening a resource file, e.g., resource bundle. A method may be defined as an object-oriented term for a procedure or function. One particular type of method may be a procedure that is used to open a resource file, e.g., resource bundle. As stated in the Background Information section, a resource bundle class is an associative array of keys and values. Keys are free formatted strings that appear in the program code as well as in the resource bundle thereby allowing the program to access the externalized string. Externalized strings may be represented as a value associated with the key. The following code depicts a resource bundle class definition written in Java code illustrating resources, i.e. key-value pairs, in a resource bundle.

```
public call Res extends java.util.ListResourceBundle {
    static final Object [ ] [ ] contents = {
        { "Holiday Title", "Christmas" },
        { "Month Title", "December" };
    public Object [ ] [ ] getContents( ) {
        return contents;
    }
}
```

In this code, "Holiday Title" and "Month Title" are the keys. The values associated with those keys are the text strings "Christmas" and "December", respectively.

Figure 3:
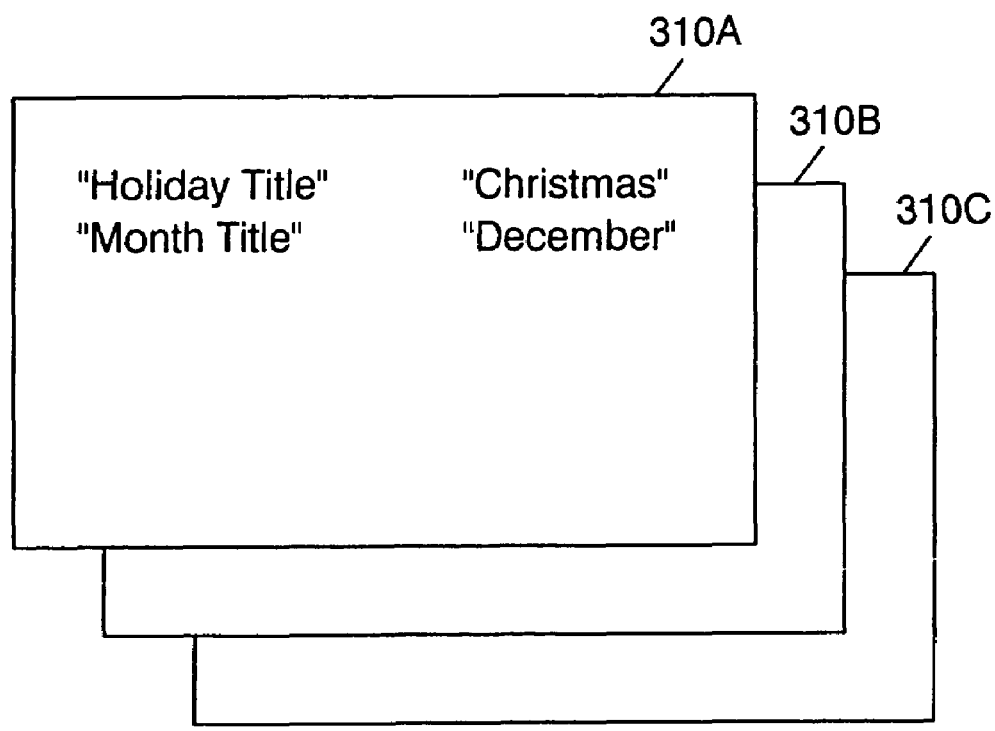
FIG. 3 illustrates key-value pairs in resource files.

An example of resource files, e.g., resource bundles, comprising key value pairs is illustrated in FIG. 3. FIG. 3 illustrates a plurality of resource files 310A–C where each resource file may be associated with a particular locale. For example, resource file 310A may be associated with a U.S. English locale. Resource file 310B may be associated with a German locale. Resource file 310C may be associated with a French locale. These resource files, e.g., 310A–C, may reside in a Java ARchive (JAR) file where the JAR file may reside in disk unit 20. Resource files 310A–C may collectively or individually be referred to as resource files 310 or resource file 310, respectively. It is noted that any number of resource files may reside in a JAR file.

Referring to FIG. 3, resource file 310A illustrates the key-value pairs for the above illustrated Java code in the U.S. English locale. Resource file 310B associated with a German locale may have the key values of "Weihnachten" and "Dezember" associated with the keys "Holiday Title" and "Month Title", respectively. Resource file 310C associated with a French locale may have the key values of "Noel" and "decembre" associated with the keys "Holiday Title" and "Month Title", respectively. Hence, a resource file 310 may be defined for each locale an application 42 supports. The application 42, e.g., Java, then loads the correct resource file 310 according to the specified locale. For example, if the application 42 were running in the German locale, then when the interpreter translates the key "Holiday Title", resource file 310B is loaded into memory and the associated key value "Weihnachten" is outputted.

An example of code, e.g., Java, that includes a method invocation to open a resource file, e.g., resource bundle, is shown below.

rbCal=ResourceLoader.getBundle("com.tivoli.uif.Re-
    sources.Calen darResources");
setTitle(ResourceLoader.getString(rbCal, "Holiday Title");
ResourceLoader is a subclass created from the abstract class
    ResourceBundle in Java. In the second line, getstring( ) is
    a method of the subclass that is used to open the resource
    bundle rbCal. The getstring( ) method in this subclass has
    two variables which will be discussed in greater detail
    below. Hence in step 210, the scanning program scans the
    code for a method invocation for opening a resource file,
    e.g., resource bundle. It is noted that the getstring( )
    method is exemplary only and that there are other method
    invocations for opening a resource file, e.g., resource
    bundle.

In step 220, a determination is made as to whether a method invocation was identified in step 210. If there was not a method invocation identified, then the scanning program generates a report in step 290 as will be described in greater detail below.

If a method invocation was identified in step 220, then the scanning program in step 230 scans the code for a method signature, i.e. pointer, of the method invocation previously identified in step 210. In one embodiment, the method signature, i.e. pointer, may be the first parameter of the method invocation, e.g., getstring( ) method of the subclass ResourceLoader. The method signature, i.e. pointer, points to a resource file, e.g., resource bundle. In the above example of Java code, the method signature is rbCal which points to the resource bundle rbCal that is defined in the first line of the above code. The path name of the resource file, e.g., resource bundle, may be defined as a parameter in a method called getBundle( ). In the subclass ResourceLoader of the abstract class ResourceBundle, the getBundle( ) method comprises one parameter that may be used for specifying the path name to the resource bundle. For example, in the above example of Java code, the path name to the resource bundle rbCal is "com.tivoli.uif.Resources. CalendarResources." Hence, the method signature rbCal points to the resource bundle rbCal and the resource bundle rbCal is loaded into memory via the getBundle( ) method which uses the path name "com.tivoli.uif.Resources.CalendarResources."

In step 240, the scanning program scans the code for a pair of string delimiters adjacent to the method signature, i.e. pointer, identified in step 230. That is, the scanning program scans the code for a string variable associated with the method invocation identified in step 210. In one embodiment, the string variable may be the second parameter of the invocation method, e.g., getstring( ) method of the subclass ResourceLoader. The string variable is a key of the resource file, e.g., resource bundle, that is pointed to by the method signature identified in step 230. For example, in the above Java code, the string "Holiday Title" adjacent to the method signature rbCal is a key of the resource bundle rbCal.

In step 250, the scanning program opens the resource file, e.g., resource bundle, identified by the method signature in step 230 using the method invocation identified in step 210, e.g., getstring( ). In the above example Java code, the getstring( ) method of the subclass ResourceLoader may be used to open the resource bundle rbcal which was identified by the method signature, i.e. pointer, of rbcal. The path name of the resource bundle rbCal to be opened may be defined as a parameter of the getBundle( ) method used to define the resource bundle rbcal.

In step 260, a determination is made by the scanning program as to whether the key string identified in step 240 as well as the value associated with that key is defined in the resource file, e.g., resource bundle, identified in step 250. A determination as to whether the key identified in step 240 is defined in the resource file, e.g., resource bundle, refers to determining whether the key identified in step 240 matches any of the key(s) (if any are defined) in the resource file, e.g., resource bundle, identified in step 250. If the resource file, e.g., resource bundle, does not comprise either the key identified in step 240 or its associated value, then the scanning program detects a resource exception error in step 270. In one embodiment, the scanning program stores resource exception errors detected that may later be printed out in a report in step 290.

If the resource file, e.g., resource bundle, does comprise a key string identified in step 240 and the associated value, then a determination is made as to whether there is more code to scan in step 280. If there is more code to scan, the scanning program continues to scan the code line by line for a method invocation for opening a resource file, e.g., resource bundle, in step 210. If there is no more code to scan, then the scanning report may generate a report in step 290. In one embodiment, the report generated may comprise a listing of all the resource exception errors detected. In another embodiment, the report may further comprise information as to the particular line(s) of code comprising keys to resource files, e.g., resource bundles, where the keys or values associated with the keys are not defined in the associated resource file, e.g., resource bundle. A software developer may then correct the mistyped keys in either the program code or resource file, e.g., resource bundle, source code or define the keys or values associated with the keys in the resource file, e.g., resource bundle, thereby avoiding a resource exception error during the run-time of the application, e.g., Java.

Upon detecting a resource exception error in step 270, a determination is made as to whether there is more code to scan in step 280. If there is more code to scan, then the scanning program continues to scan the code line by line for a method invocation for opening a resource file, e.g., resource bundle, in step 210. If there is no more code to scan, then the scanning report may generate a report in step 290. In one embodiment, the report generated may comprise a listing of all the resource exception errors detected. In another embodiment, the report may further comprise information as to the particular line(s) of code comprising keys to resource files, e.g., resource bundles, where the keys or values associated with the keys are not defined in the associated resource file, e.g., resource bundle. A software developer may then correct the mistyped keys in either the program code or resource file, e.g., resource bundle, source code or define the keys or values associated with the keys in the resource file, e.g., resource bundle, thereby avoiding a resource exception error during the run-time of the application, e.g., Java.

It is noted that the scanning program may reside in disk unit 20 or application 42. It is further noted that the scanning program of the present invention may be implemented to detect resource exception errors in any type of programming language that has the capability of externalizing text strings in resource files.

Although the method, computer program product and data processing system of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A computer-implemented method for detecting resource exception errors comprising the steps of:
   scanning a code for a first method invocation used to open a first resource file, wherein the resource file is an associative array of keys and values;
   identifying said first method invocation; and
   opening said first resource file using said first method invocation to detect resource exception errors based on the associative array of keys and values.

2. A computer-implemented method for detecting resource exception errors comprising the steps of:
   scanning a code for a first method invocation used to open a first resource file;
   identifying said first method invocation;
   opening said first resource file using said first method invocation to detect resource exception errors;
   scanning said code for a first method signature; and
   scanning said code for a first pair of string delimiters adjacent to said first method signature, wherein a string within said first pair of string delimiters adjacent to said first method signature is a key of said first resource file.

3. The computer-implemented method as recited in claim 2, wherein said first method signature indicates said first resource file.

4. The computer-implemented method as recited in claim 2, wherein said first method signature is a first parameter of said first method invocation.

5. The computer-implemented method as recited in claim 2, wherein said key of said first resource file is a second parameter of said first method invocation.

6. The computer-implemented method as recited in claim 2 further comprising the step of:
   determining whether said key and its associated value of said first resource file are defined in said first resource file.

7. The computer-implemented method as recited in claim 6, wherein if said key or its associated value of said first resource file is not defined in said first resource file, then a resource exception error is detected.

8. The computer-implemented method as recited in claim 6, wherein if said key and its associated value of said first resource file are defined in said first resource file, then the method further comprises the step of:
determining whether to scan more code for a second method invocation used to open a second resource file.

9. The computer-implemented method as recited in claim 8, wherein if there is more code to scan, then the method further comprises the step of:
scanning said code for said second method invocation used to open said second resource file.

10. The computer-implemented method as recited in claim 9 further comprising the steps of:
identifying said second method invocation; and
opening said second resource file using said second method invocation to detect resource exception errors.

11. The computer-implemented method as recited in claim 9, wherein said second method invocation was not identified, wherein the method further comprises the step of:
generating a report.

12. The computer-implemented method as recited in claim 11, wherein said report comprises a listing of all resource exception errors detected.

13. The computer-implemented method as recited in claim 8, wherein if there is no more code to scan, then the method further comprises the step of:
generating a report.

14. The computer-implemented method as recited in claim 13, wherein said report comprises a listing of all resource exception errors detected.

15. The computer-implemented method as recited in claim 7 further comprising the step of:
determining whether to scan more code for a second method invocation used to open a second resource file.

16. The computer-implemented method as recited in claim 15, wherein if there is more code to scan, then the method further comprises the step of:
scanning said code for said second method invocation used to open said second resource file.

17. The computer-implemented method as recited in claim 16 further comprising the steps of:
identifying said second method invocation; and
opening said second resource file using said second method invocation to detect resource exception errors.

18. The computer-implemented method as recited in claim 16, wherein said second method invocation was not identified, wherein the method further comprises the step of:
generating a report.

19. The computer-implemented method as recited in claim 18, wherein said report comprises a listing of all resource exception errors detected.

20. The computer-implemented method as recited in claim 15, wherein if there is no more code to scan, then the method further comprises the step of:
generating a report.

21. The computer-implemented method as recited in claim 20, wherein said report comprises a listing of all resource exception errors detected.

22. A computer program product in a computer readable medium for enabling a computer to detect resource exception errors, comprising:

programming operable for scanning a code for a first method invocation used to open a first resource file comprising locale specific text strings and associated keys;
programming operable for identifying said first method invocation; and
programming operable for opening said first resource file using said first method invocation to detect resource exception errors based on the locale specific text strings and the associated keys.

23. A computer program product in a computer readable medium for enabling a computer to detect resource exception errors, comprising:
programming operable for scanning a code for a first method invocation used to open a first resource file:
programming operable for identifying said first method invocation;
programming operable for opening said first resource file using said first method invocation to detect resource exception errors;
programming operable for scanning said code for a first method signature; and
programming operable for scanning said code for a first pair of string delimiters adjacent to said first method signature, wherein a string within said first pair of string delimiters adjacent to said first method signature is a key of said first resource file.

24. The computer program product as recited in claim 23, wherein said first method signature indicates said first resource file.

25. The computer program product as recited in claim 23, wherein said first method signature is a first parameter of said first method invocation.

26. The computer program product as recited in claim 23, wherein said key of said first resource file is a second parameter of said first method invocation.

27. The computer program product as recited in claim 23 further comprises:
programming operable for determining whether said key and its associated value of said first resource file are defined in said first resource file.

28. The computer program product as recited in claim 27, wherein if said key or its associated value of said first resource file is not defined in said first resource file, then a resource exception error is detected.

29. The computer program product as recited in claim 27, wherein if said key and its associated value of said first resource file are defined in sad first resource file, then the computer program product further comprises:
programming operable for determining whether to scan more code for a second method invocation used to open a second resource file.

30. The computer program product as recited in claim 29, wherein if there is more code to scan, then the computer program product further comprises:
programming operable for scanning said code for said second method invocation used to open said second resource file.

31. The computer program product as recited in claim 30 further comprises:
programming operable for identifying said second method invocation; and
programming operable for opening said second resource file using said second method invocation to detect resource exception errors.

32. The computer program product as recited in claim 30, wherein said second method invocation was not identified, wherein the computer program product further comprises:
 programming operable for generating a report.

33. The computer program product as recited in claim 32, wherein said report comprises a listing of all resource exception errors detected.

34. The computer program product as recited in claim 29, wherein if there is no more code to scan, then the computer program product further comprises:
 programming operable for generating a report.

35. The computer program product as recited in claim 34, wherein said report comprises a listing of all resource exception errors detected.

36. The computer program product as recited in claim 28 further comprises:
 programming operable for determining whether to scan more cods for a second method invocation used to open a second resource file.

37. The computer program product as recited in claim 36, wherein if there is more code to scan, then the computer program product further comprises:
 programming operable for scanning said code for said second method invocation used to open said second resource file.

38. The computer program product as recited in claim 37 further comprises:
 programming operable for identifying said second method invocation; and
 programming operable for opening said second resource file using said second method invocation to detect resource exception errors.

39. The computer program product as recited in claim 37, wherein said second method invocation was not identified, wherein the computer program product further comprises:
 programming operable for generating a report.

40. The computer program product as recited in claim 39, wherein said report comprises a listing of all resource exception errors detected.

41. The computer program product as recited in claim 36, wherein if there is no more code to scan, then the computer program product further comprises:
 programming operable for generating a report.

42. The computer program product as recited in claim 41, wherein said report comprises a listing of all resource exception errors detected.

43. A data processing system, comprising:
 a processor;
 a memory unit for storing instructions of said processor;
 an input mechanism;
 an output mechanism;
 a bus system for coupling the processor to the memory units input mechanism, and output mechanism,
 means for scanning a code for a first method invocation used to open a first resource file comprising locale specific text strings;
 means for identifying said first method invocation; and
 means for opening said first resource file using said first method invocation to detect resource exception errors relating to the locate specific text strings.

44. A data processing system, comprising
 a processor:
 a memory unit for storing instructions of said processor;
 an input mechanism;
 an output mechanism;
 a bus system for coupling the processor to the memory unit, input mechanism, and output mechanism,
 means for scanning a code for a first method invocation used to open a first resource file;
 means for identifying said first method invocation;
 means for opening said first resource file using said first method invocation to detect resource exception errors;
 means for said code for a first method signature; and
 means for scanning said code far a first pair of string delimiters adjacent to said first method signature, wherein a string within said first pair of string delimiters adjacent to said first method signature is a key of said first resource file.

45. The data processing system as recited in claim 44, wherein said first method signature indicates said first resource file.

46. The data processing system as recited in claim 44, wherein said first method signature is a first parameter of said first method invocation.

47. The data processing system as recited in claim 44, wherein said key of said first resource file is a second parameter of said first method invocation.

48. The data processing system as recited in claim 44, wherein the system further comprises:
 means for determining whether said key and its associated value of said first resource file are defined in said first resource file.

49. The data processing system as recited in claim 48, wherein if said key or its associated value of said first resource file is not defined in said first resource file, then a resource exception error is detected.

50. The data processing system as recited in claim 48, wherein if said key and its associated value of said first resource file are defined in said first resource file, then the system further comprises:
 means for determining whether to scan more code for a second method invocation used to open a second resource file.

* * * * *